March 24, 1964   R. H. HAMILTON, SR., ET AL   3,126,178
CATAPULT LOCKING MECHANISM FOR EJECTION SEAT
Filed April 16, 1962   3 Sheets-Sheet 1
FIG./
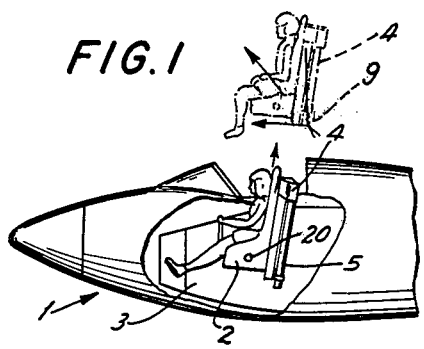
FIG.2A
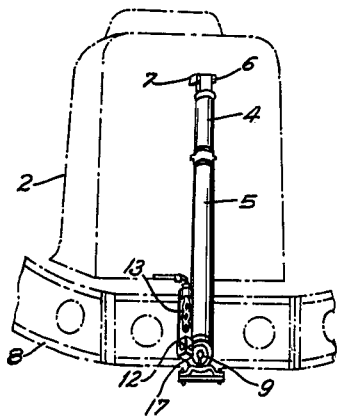
FIG.2B
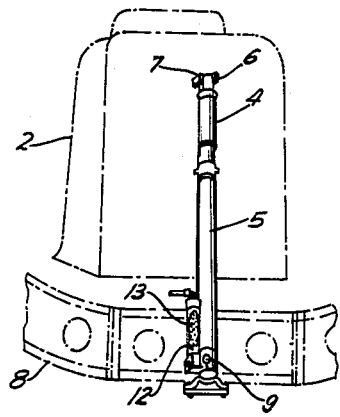
FIG.2C
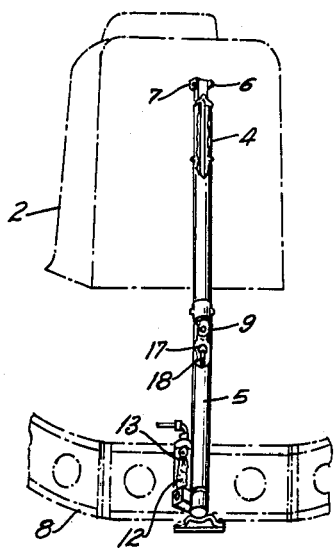
FIG.2D
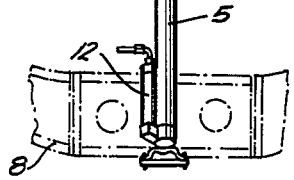
INVENTORS
RALPH H. HAMILTON, Sr.
MARTIN A. RUBINSTEIN
BY
Curtis, Morris & Safford
ATTORNEYS

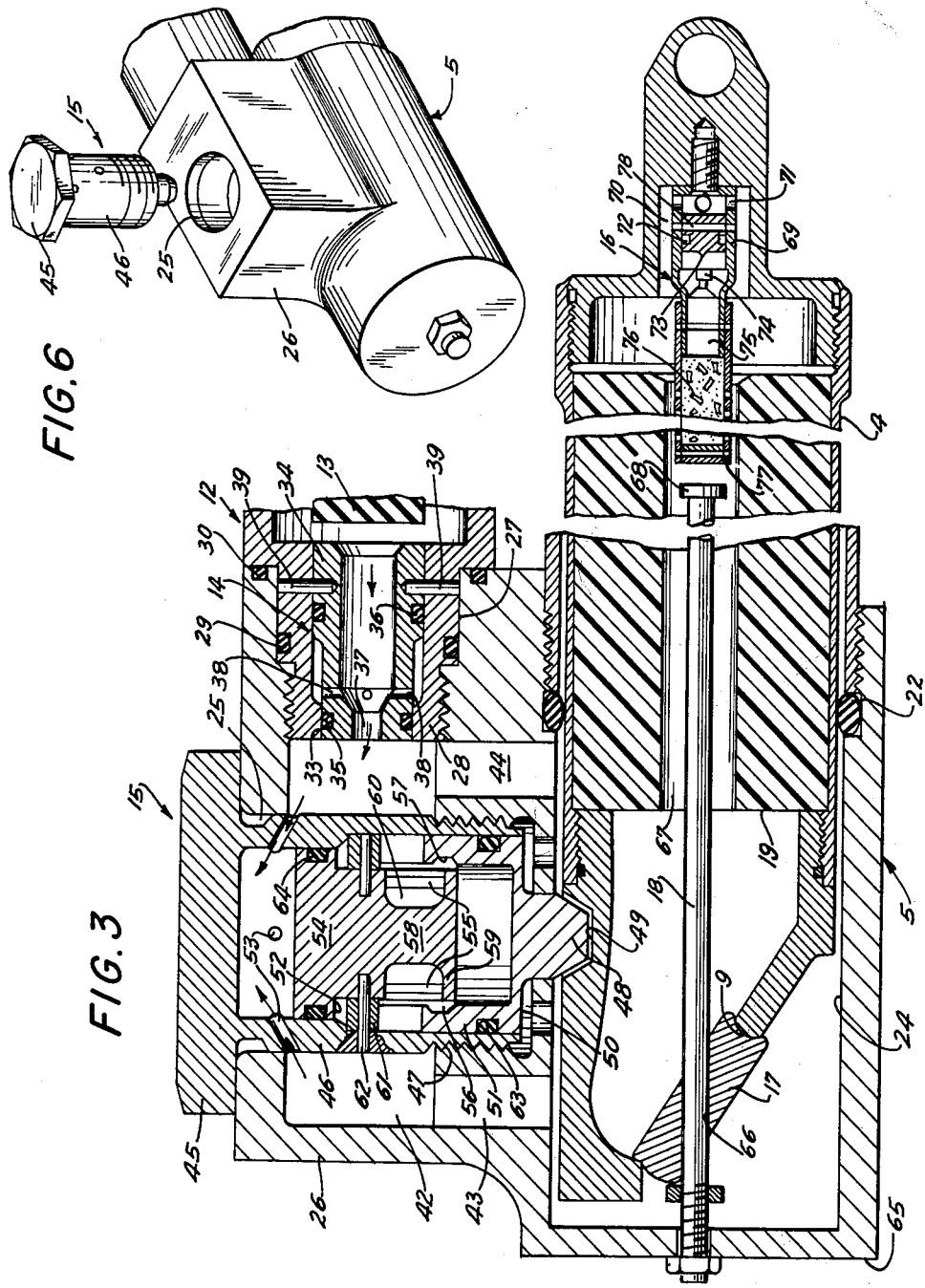

March 24, 1964   R. H. HAMILTON, SR., ETAL   3,126,178
CATAPULT LOCKING MECHANISM FOR EJECTION SEAT
Filed April 16, 1962   3 Sheets-Sheet 3

INVENTORS
RALPH H. HAMILTON, Sr.
MARTIN A. RUBINSTEIN
BY
Curtis, Morris & Safford
ATTORNEYS

United States Patent Office 3,126,178
Patented Mar. 24, 1964

3,126,178
CATAPULT LOCKING MECHANISM FOR EJECTION SEAT
Ralph H. Hamilton, Sr., Cornwell Heights, and Martin A. Rubinstein, Morrisville, Pa., assignors to Thiokol Chemical Corporation, Bristol, Pa., a corporation of Delaware
Filed Apr. 16, 1962, Ser. No. 187,881
6 Claims. (Cl. 244—122)

The present invention relates to a locking mechanism and more particularly to an improved locking mechanism for releasibly locking objects to a carrier such as aircraft or the like.

While the present invention may have other applications, it is particularly adapted for use with a catapult for ejecting objects, such as a pilot and his seat, from high-speed jet aircraft. Such objects must be propelled from the aircraft so as to maintain a forward as well as an outward movement to clear the aircraft before the object is allowed to descend. It has heretofore been proposed to provide a rocket engine for propelling such objects as they leave the aircraft and to initially launch the rocket engine from the aircraft by means of a catapult.

One of the objects of the present invention is to provide an improved locking device which may be automatically operated by remote control to releasing position.

Another object is to provide a locking device for locking an object to a catapult from which it is to be ejected and which is actuated to releasing position by the fluid used to operate the catapult.

Another object is to provide a locking device for locking a catapult-launched and rocket-propelled pilot's seat to an aircraft frame and automatically releasing the seat upon a signal from the pilot to operate the catapult.

Still another object is to provide a locking device of the type indicated which is of relatively simple and compact construction, economical to manufacture and one which is reliable in operation.

These and other objects will become more apparent from the following descriptions and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a side elevational view of a portion of an aircraft and partially broken away to show the rocket engine catapult to which the present invention is applied attached to the back of the pilot's seat;

FIGURE 2-A is a perspective view of the rear of the pilot's seat showing the normal position of the parts of the catapult;

FIGURE 2-B is a figure similar to FIGURE 2-A, showing the relationship of the rocket engine to its catapult after initial operation;

FIGURE 2-C is a view similar to FIGURE 2-A, showing the nozzle closure being stripped from the rocket engine during movement of the engine relative to the catapult casing;

FIGURE 2-D is a view similar to FIGURE 2-A, showing the rocket engine propellant ignited as the latter moves out of the catapult casing;

FIGURE 3 is an enlarged longitudinal section through the rearward and forward ends of the catapult casing and rocket engine, respectively, and showing the locking device of the present invention in position to lock the rocket engine to the catapult;

FIGURE 6 is a perspective view of the rearward end of the catapult casing and showing the manner in which the locking device is removably applied to the catapult as a unit;

Figure 4:
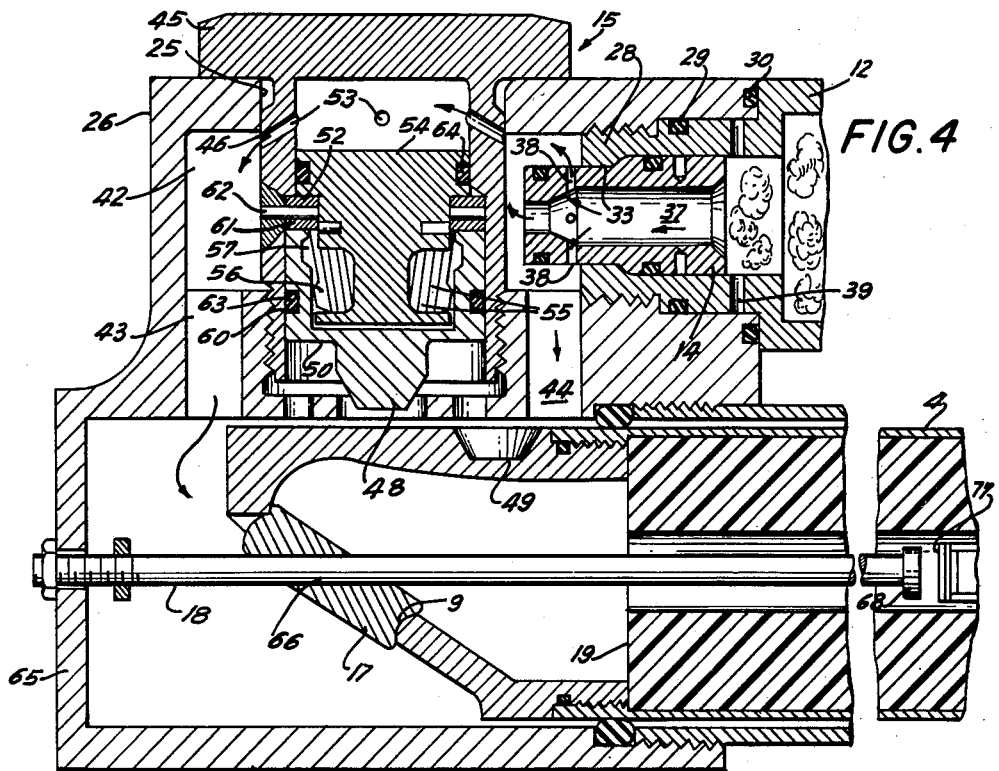
FIGURE 4 is a sectional view of the rearward end of the catapult casing, similar to FIGURE 3, and showing the locking device operated to releasing position, the flow control device actuated and the rocket engine being propelled by gas flowing from the gas generator.
Figure 5:
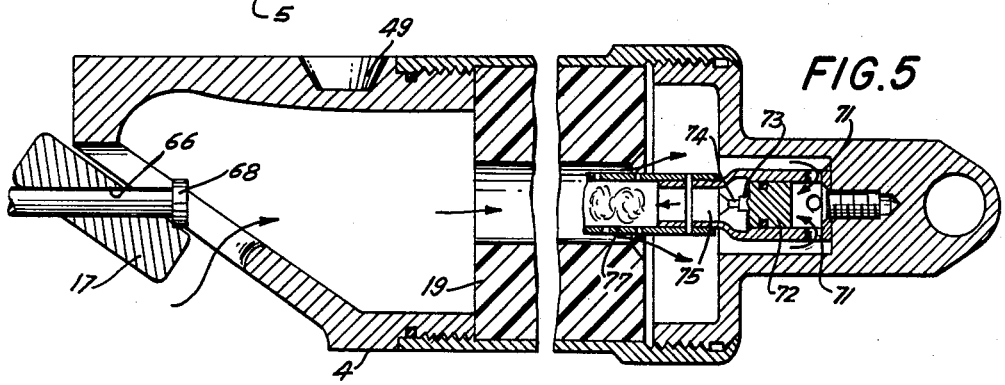
FIGURE 5 is a view of the rearward end of the rocket engine as it is being propelled and showing the nozzle closure being stripped from the rocket engine.

Referring first to FIGURES 1 and 2 of the drawings, the present invention is shown applied to an aircraft 1 for ejecting a pilot's seat 2 from the cockpit 3. It will be understood, however, that the present invention may be used to lock other objects to an aircraft, such as cargo containers, canopies, hatches or the like, or for other purposes. In the illustrated embodiment the pilot's seat is ejected by a rocket engine 4 attached to the back of the seat. Rocket engine 4 is illustrated in the form of a tube mounted in a catapult casing 5 with its upper end projecting therefrom and connected to a suitable bracket 6 on the back of the pilot's seat by means of a pin 7. Catapult casing 5, on the other hand, is rigidly connected to the frame 8 of the aircraft, as clearly shown in FIGURES 2-A to 2-D. Rocket engine 4 and catapult casing 5 extend downwardly and forwardly along and parallel to the back of the pilot's seat 2, and the nozzle 9 of the rocket engine is directed downwardly and rearwardly, see FIGURES 1 and 2, to produce a force on the seat having upward and forward components. The rocket engine 4 and catapult casing 5 are illustrated as single tubes for convenience of illustration, but usually comprise plural tubes.

The ejecting system to which the locking mechanism 15 is shown applied in FIGURE 3 comprises, in general, a gas generator 12 containing a material 13 which produces gas at a rapid rate when burned, a flow control device 14 for limiting the pressure in the gas generator, and an ignition system including an igniter 16 operable responsive to pressure, a closure 17 for the nozzle 9 of the rocket engine 4, a cooperating stripper for stripping the closure from the nozzle during movement of the rocket engine to subject the igniter to the pressure of the gases. The present invention is directed to the locking mechanism 15 and associated elements. The flow control device 14 and the ignition system, respectively, together with certain elements with which they cooperate constitute separate inventions and are covered in separate applications for patents filed concurrently herewith.

The gas generator 12 comprises a relatively small chamber, see FIGURES 2-A to 2-D, filled with the gas-producing material 13 which may be the same material as the solid rocket propellant material 19 used in the rocket engine 4, see FIGURE 3. The gas-producing material 13 may be ignited in any suitable way, such as by electrical ignition of a squib, and controlled by a button 20 on the side of the pilot's seat 2, see FIGURE 1, or by any other suitable device under the manual control of the pilot. The gas so generated flows from the chamber 12 through the passages to operate the flow control device 14 when required, and the locking device 15 to release the rocket engine 4 and to the catapult casing. The gas supplied to the catapult casing 5 acts on the rearward end of the rocket engine 4 and closure 17, which together constitute a piston, for initially propelling the engine relative to the casing from the position illustrated in FIG- URE 2–A to that illustrated in FIGURE 2–B. As the rocket engine 4 moves relative to the catapult casing 5 and frame 8 of the aircraft, it also carries with it the pilot's seat 2. The movement of the rocket engine 4 continues relative to the catapult casing 5 until the stripping device 18 operates to withdraw the closure 17 from the nozzle 9 of the rocket engine 4, as illustrated in FIGURE 2–C. The high-pressure gases for propelling the rocket engine 4 then enter the rocket engine through the open nozzle 9 and produce a pressure shock wave therein. Igniter 16, operable in response to pressure, then ignites the rocket propellant 19 at the precise time required to propel the rocket engine 4 as its nozzle leaves the catapult casing 5.

As shown more in detail in FIGURES 3 to 6 of the drawings, the various elements of the catapult for controlling the rocket engine 4 are assembled in a single unit in the casing 5. Casing 5 has a cylindrical bore 24 in which the rocket engine 4 is mounted, a cylindrical bore 25 in a boss 26 and extending at right angles to the bore 24 for mounting the locking mechanism 15 constituting the subject matter of the present invention, and a cylindrical bore 27 in the boss 26 extending parallel to the cylindrical bore 24 for mounting the gas generator chamber 12. The gas generating chamber 12 has a reduced threaded nipple 28 at one end which is screwed into the boss 26 and the nipple and boss have cooperating offset annular shoulders with annular seals 29 and 30 between the parts. Similarly, the bore 24 has a seal 22 for cooperation with the periphery of the rocket motor 4.

The flow control device 14 is in the form of a hollow piston and mounted to slide in the nipple 31 of the gas generating chamber 12. As shown most clearly in FIGURE 3, the inside of the nipple 28 is countersunk to form an annular internal rim 33 at its outer end and the flow control piston has a diameter to closely fit the interior of the rim and an enlarged hub portion 34 adapted to closely fit the larger diameter of the nipple. O-rings 35 and 36 are provided between the offset portions of the piston and the nipple to seal the joints therebetween. Flow control piston 14 has an axial bore 37 through which the generated gas may flow, and a series of radial bores 38 for relieving the pressure acting on the piston when the latter is moved axially. Shear pins 39 extend through the flow control piston 14 and nipple 31 of the gas generating chamber 12 and the shear pins are of such size and number as to shear when a predetermined pressure is applied to the piston. When the pins 39 have sheared, the control piston 14 moves from the position illustrated in FIGURE 3 to that illustrated in FIGURE 4 to position the radial ports 44 outside the nipple 31 and thereby relieve the pressure. Relief of pressure in the gas generating chamber 12 reduces the rate of burning of the gas producing material 13. Thus, the relief of pressure by the flow control device 14 prevents excessive pressure in the gas generating chamber 12 and produces the desired lower pressure over a longer period of time by decreasing the burning rate.

Figure 7:
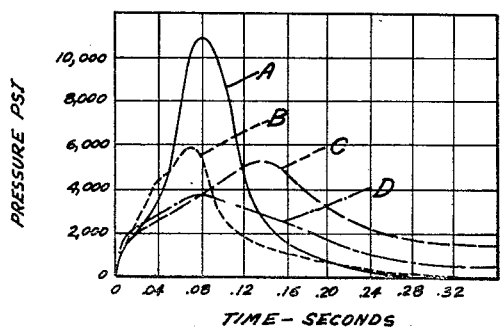
FIGURE 7 is a chart showing the effect of the flow control device between the gas generator and rocket engine to maintain a more uniform pressure over a longer period of time.

The chart in FIGURE 7 illustrates the relationship of the burning rate of the gas producing material 13 to the pressure in the generating chamber 12. In the chart, time in seconds is plotted against pressure. Curve A illustrates the excessive pressure produced with a single sonic flow orifice of 0.182 inch diameter in ambient temperatures of 200° F. as compared with curve B illustrating the lower pressure produced when using a two-stage sonic flow orifice arrangement having a primary orifice of 0.182 inch diameter and four secondary orifices of 0.050 inch diameter. When the single orifice is used a pressure in excess of 10,000 p.s.i. results, but when the two-stage orifice is used the peak pressure is less than 6,000 p.s.i. It will be observed also that the lower pressure curve B crosses the curve A and produces a higher pressure which is maintained for a longer period of time. The curves C and D correspond to curves A and B, but at an ambient temperature of −65° F. with the same single and double-stage flow orifices, respectively.

The boss 26 of the catapult casing 5 is cored to provide an annular chamber 42 around the locking device 15 and ports 43 and 44 extending from the chamber to the cylindrical bore 24 in the casing. Thus, gases from the generating chamber 12 flow through the flow control device 14 into the annular chamber 42 and then through the ports 43 and 44 into the bore 24 of the catapult casing to act on the rearward end of the rocket engine to propel it outwardly from the casing.

A stripper 18 of any suitable construction is attached the catapult casing 5. In the illustrated embodiment the stripper 18 comprises a rod having its rearward end extending through and attached to the rearward wall 65 of the catapult casing 5. The strip rod 18 extends forwardly from the wall 65 through a hole 66 in the closure 17 for the nozzle 9 and into the rocket engine 4 and, more specifically, into the annular opening 67 in the propellant material 17. The inner end of the strip rod 18 is provided with an enlarged head 68, as shown in FIGURES 3 and 4.

The igniter 16 comprises a cylinder sleeve 69 mounted fast to the attached end of the rocket engine at the axis of a recess 70 and has ports 71 opening into the recess. Mounted to slide in the cylinder sleeve 69 is a piston 72 having a firing pin 73 at its inner side which operates in the manner of a hammer in firearms. Adjacent to the firing pin 73 is a percussion cap 74 in intimate contact with a primer material 75 which, in turn, has access to flammable powder 76. The flammable powder 76 is contained in a perforate cylinder 77 through which the flame escapes to ignite the propellant material 19 for the rocket engine. The piston 72 of the igniter 16 is restrained by a pin 78 which is sheared by high-pressure gas to operate piston 72 to ignite the propellant material 19.

The locking device 15 of the present invention is removably mounted in the boss 26 of the catapult casing 5 as a unit and for purposes of illustration is shown in the form of a nut having a hexagonal head 45 and a hollow shank 46. The end of shank 46 has a screw-threaded end 47 which is screwed into corresponding screw threads in bore 25 to mount the locking device in the boss 26. The locking device 15 is in the form of a bolt 48 projecting into a keeper groove 49 in the side of the rocket engine 4 to positively lock the engine 4 to the catapult casing 5. Bolt 48 projects from the circular end of a hollow piston 50 having an annular skirt 51 closely fitting the interior of the shank 46. Piston 50 and bolt 48 are held in the shank 46 so that the bolt 48 will project into the keeper 49 by means of a second piston 54 in the shank which overlies the lower piston 50 and a series of tangs 55 extending between the pistons. The tangs 55 are provided with enlarged laterally projecting ends 56 extending into a correspondingly shaped annular groove 57 in the interior of the skirt of the hollow piston 50. Depending from the piston 54 is a stem 58 having a flange 59 at the inside of the tangs 55 and skirt 51 of piston 50 and overlying the enlarged ends 56 of the tangs to prevent them from collapsing inwardly. Flange 59 and reduced stem 58 provide an annular recess 60 into which the ends of the tangs may collapse inwardly when the piston 54 moves downwardly with respect to the piston 50.

The tangs 55 depend from an annular ring 61 surrounding a reduced portion of the piston 54 and the ring is connected to the piston 54 by a series of shear pins 62. Ring 61 surrounds a reduced portion of the piston 54 providing an annular shoulder 52 which engages the ring when the flange 59 has moved to a position to uncover the enlarged ends 56 of tangs 55. At least one of the shear pins 62 extends through the ring into the wall of the hollow shank 46. Pistons 50 and 54 are sealed to the inner wall of the shank 46 by O-ring seals 63 and 64. The annular wall of the hollow shank 46 also has a series of ports 53 extending upwardly at an angle from the annular chamber 42 to the space at the top of piston 54 and the end of piston 50 is subjected to the pressure of the gas flowing through the ports 43 and 44 into the cylindrical bore 24.

Thus, pressure applied to the top of piston 54 will shear pins 62 and cause the piston to move downwardly and position the enlarged ends 56 adjacent to the annular recess 60 to release piston 50. Further downward movement of piston 54 engages its shoulder 52 with the ring 61 to move the ring and tangs 55 with it relative to piston 50 and this relative movement will cause the enlarged ends 56 of the tangs to be cammed inwardly and out of the groove 57 in piston 50 to release the latter. Actually, the two pistons 50 and 54 move toward each other, simultaneously, into telescoped relation. As will be observed in FIGURE 3, the wall of the hollow shank 46 is stepped so that the piston 50 has a slightly larger area than the piston 54 so that the two pistons move as a unit to the unlocking position illustrated in FIGURE 4. One form of the invention having now been described in detail, the mode of operation is next explained.

When the pilot wishes to be ejected, he presses the button 20 at the side of his seat, which closes an electric circuit to ignite the material in the gas generating chamber 12. Gas from the gas generator 12, see FIGURE 3, flows through the flow control device 14 and into the annular chamber 42 surrounding the locking device 15. The gas then flows from the chamber 42 through the ports 43 and 44 to the cylindrical bore 24 in the catapult casing to act on the rocket engine 4 and piston 50 of the locking device. Simultaneously gas flows through the ports 53 into the chamber overlying the piston 54 of the locking device 15.

The pressure of the gases acting on the piston 54 shears the pins 62 to cause the piston 54 to move downward relative to ring 61 and piston 50 until the flange 59 is positioned below the tangs 55, as illustrated in FIGURE 4. Immediately upon release of the tangs 55, the shoulder 52 on the piston 54 engages the ring 61 and shears the shear pin 62 extending into the wall of the shank 46. This downward force of the piston 54 relative to the piston 50 causes the enlarged ends 56 of the tangs 55 to be cammed inwardly into the annular space 60 in the piston 54 which releases the piston 50. The pressure acting on the larger surface of the piston 50 then moves the latter, together with the piston 54, from the position illustrated in FIGURE 3 to that illustrated in FIGURE 4. Such upward movement of the piston 50 withdraws the locking bolt 48 from the keeper groove 49 in the rocket engine.

As soon as the locking bolt 48 has been withdrawn, the high-pressure gases from the gas generator 12 act on the rearward end of the rocket engine 4 and closure 17 for the nozzle 9, which together act as a piston, to propel the rocket engine from the catapult casing 5. The forward movement of the rocket engine 4 from catapult casing 5 causes the rod 18 to strip the closure 17 from nozzle 9 to permit the high-pressure gases to enter the rocket engine through the nozzle. The pressure of the gases then actuates the hammer-like piston 72 having the firing pin 73. Firing pin 73 explodes the percussion cap 74 which, in turn, ignites the primer material 75 and flammable powder 76. Powder 76 burns and projects its flame through the perforation in cylinder 77 to ignite the propellant 19 for the rocket engine. Thus, the propellant material 19 is ignited just prior to the ejection of the nozzle end of the rocket engine from the catapult. Thus, the rocket engine 4 is self-propelled immediately upon leaving the catapult casing 5 and ejects the pilot and his seat 2 forwardly and upwardly so that it will clear the aircraft 1 before it starts to descend.

It will now be observed that the present invention provides an improved locking device which may be automatically operated from a remote control. It will further be observed that the present invention provides a locking device for locking an object to a catapult and which is actuated to releasing position by the fluid used to operate the catapult. It will further be observed that the present invention provides a locking device for locking a catapult-launched and rocket-propelled pilot's seat to an aircraft frame. It will still further be observed that the present invention provides a locking device of the type indicated which is of relatively simple and compact construction, economical to manufacture and one which is reliable in operation.

While a single embodiment of the invention is herein described and illustrated, it will be understood that changes may be made in the construction and arrangements of elements without departing from the spirit or scope of the invention. Therefore without limitation in this respect, the invention is defined by the following claims.

We claim:

1. In a catapult for ejecting an object, a frame, a catapult casing attached to the frame, said object to be ejected extending at least in part into the casing and having a locking notch therein, a chamber in the casing having an open side adjacent the object to be ejected, a cylindrical wall in said chamber having an open end adjacent said object to the ejected, a piston in cylindrical wall and having a bolt projecting into the locking notch in the object to be released and ejected, locking mechanism in said cylinder wall and including a frangible element acting on the piston to hold the bolt in locking position, a gas generator for generating gas at high pressure and connected to deliver said gas to said chamber, and means in said cylindrical wall connected to deliver said high pressure gas to the locking mechanism to break the frangible element and thereby release the locking mechanism, and said gas in said chamber acting on and operating the piston to withdraw the bolt and passing through the open side of the chamber into said casing to act on the object and eject it from the frame.

2. In an aircraft, a catapult for ejecting a pilot's seat comprising a rocket engine connected to the back of the seat and having a locking notch at one side, a catapult casing attached to the aircraft frame and enclosing a part of the rocket engine, a chamber in the casing having an open side in communication with the enclosed part of the rocket engine, locking mechanism for locking the rocket engine to the catapult casing comprising a piston in the chamber of the catapult casing and having a bolt at one end for engaging the locking notch in the rocket engine, mechanism including a frangible element for holding the piston and bolt in locking engagement with the rocket engine, a gas generator for generating high pressure gas, and means connected to deliver said high pressure gas to the mechanism to break the frangible element, and said gas in said chamber acting on and operating the piston to withdraw the bolt and thereby release the rocket engine and passing through the open side of said chamber into said casing to eject the rocket engine therefrom.

3. Locking mechanism in accordance with claim 2 in which the locking mechanism comprises a second piston in the chamber, an intermediate interlocking member between the pistons, and the frangible element is a shear pin extending between the second piston and intermediate interlocking member.

4. Locking mechanism in accordance with claim 3 in which the intermediate interlocking member is a ring surrounding the second piston and having depending tines, curved projections on the tines engaging correspondingly shaped recesses in the first mentioned piston, and a stem depending from the second mentioned piston and having a flange overlying the tines whereby the second mentioned piston may move relative to the ring when the shear pin is broken to cause the flange to release the tines.

5. Locking mechanism for releasing an object comprising a casing having a chamber therein, said object to be ejected extending at least in part into said casing, a cylindrical tapped bore in the casing, a self-contained locking unit having a cylindrical wall with screw threads on its periphery and screwed into the cylindrical tapped bore in the casing, said self-contained locking unit having a piston in the cylinder wall with a locking bolt projecting therefrom in engagement with the object to be released, a second piston in the cylinder wall, a collar surrounding the second piston and having depending tines, curved projections on the tines engaging a correspondingly shaped recess in the first mentioned piston, a stem depending from the second mentioned piston and having a flange overlying the tines, shear pins extending between the collar and second mentioned piston to hold its flange in overlying relation to the tines, at least one of the shear pins extending from the collar through the wall of the hollow casing of the self-contained unit, a gas generator for generating gases at high pressure, means utilizing the high pressure gas to break the frangible shear pins to release the piston, and ports in the casing for directing generated gas to the chamber to actuate the piston and bolt to an unlocking position.

6. Locking mechanism in accordance with claim 5 in which the casing for the locking mechanism has a tapped bore extending laterally from the tapped bore for the locking unit, the gas generator being a self-contained unit having a nipple at one end screwed into the laterally extending tapped bore, and ports in the casing and wall of the hollow locking unit for directing gas from the generator to the opposed first and second pistons.

References Cited in the file of this patent

UNITED STATES PATENTS

| | | |
|---|---|---|
| 2,445,400 | Johnson | July 20, 1948 |
| 2,479,713 | Beach | Aug. 23, 1949 |
| 2,516,902 | Musser | Aug. 1, 1950 |
| 2,527,020 | Martin | Oct. 24, 1950 |
| 2,689,697 | Stanley | Sept. 21, 1954 |
| 2,707,086 | Kennard | Apr. 26, 1955 |
| 2,900,150 | Hirt et al. | Aug. 18, 1959 |

UNITED STATES PATENT OFFICE
CERTIFICATE OF CORRECTION

Patent No. 3,126,178            March 24, 1964

Ralph H. Hamilton, Sr., et al.

It is hereby certified that error appears in the above numbered patent requiring correction and that the said Letters Patent should read as corrected below.

Column 6, line 25, for "the" read -- be --; same line 25, after "in" insert -- the --.

Signed and sealed this 28th day of July 1964.

(SEAL)

Attest:

ESTON G. JOHNSON            EDWARD J. BRENNER
Attesting Officer            Commissioner of Patents